United States Patent [19]

Ito

[11] Patent Number: 4,705,393
[45] Date of Patent: Nov. 10, 1987

[54] COPYING APPARATUS WITH A DOCUMENT FEEDER

[75] Inventor: Masazumi Ito, Toyohashi, Japan

[73] Assignee: Minolta Camera Kabushiki Kaisha, Osaka, Japan

[21] Appl. No.: 813,948

[22] Filed: Dec. 27, 1985

[30] Foreign Application Priority Data

Dec. 27, 1984 [JP] Japan .................................. 59-275687

[51] Int. Cl.⁴ .......................... G03G 15/00; B65H 7/02
[52] U.S. Cl. .................................... 355/14 SH; 271/9; 271/259; 271/265; 355/3 SH; 355/14 E; 355/14 R
[58] Field of Search .............. 355/3 SH, 14 SH, 14 R, 355/14 E; 271/9, 258-259, 265

[56] References Cited

U.S. PATENT DOCUMENTS

| 4,170,414 | 10/1979 | Hubert et al. ................. 355/3 SH X |
| 4,192,607 | 3/1980 | Hage .......................... 355/14 SH X |
| 4,523,752 | 6/1985 | Kigawa et al. ................. 271/265 X |
| 4,621,921 | 11/1986 | Takahata et al. ............... 355/14 SH |

Primary Examiner—Arthur T. Grimley
Assistant Examiner—Jane K. Lau
Attorney, Agent, or Firm—Burns, Doane, Swecker & Mathis

[57] ABSTRACT

The present invention relates to a copying apparatus with a document feeder. A document being copied is fed out from the copying position to a retaining position where it is held temporarily upon initiation of an interruption copying mode. The document is held at the retaining position while another document is copied and upon release of the interruption copying mode, the document is automatically fed back to the copying position from the retaining position to resume the copying.

4 Claims, 23 Drawing Figures

FIG.15
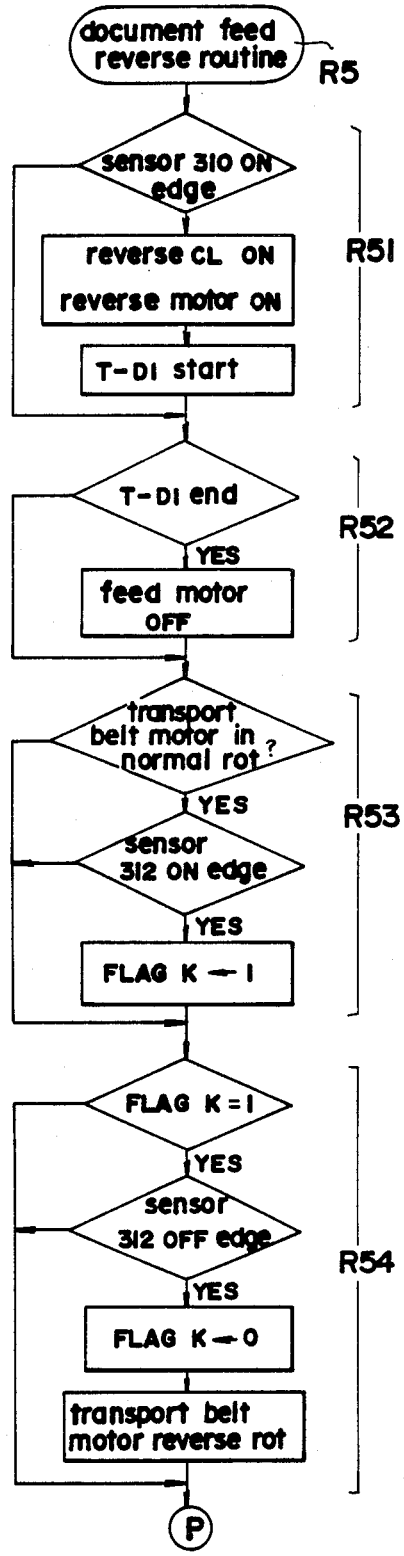
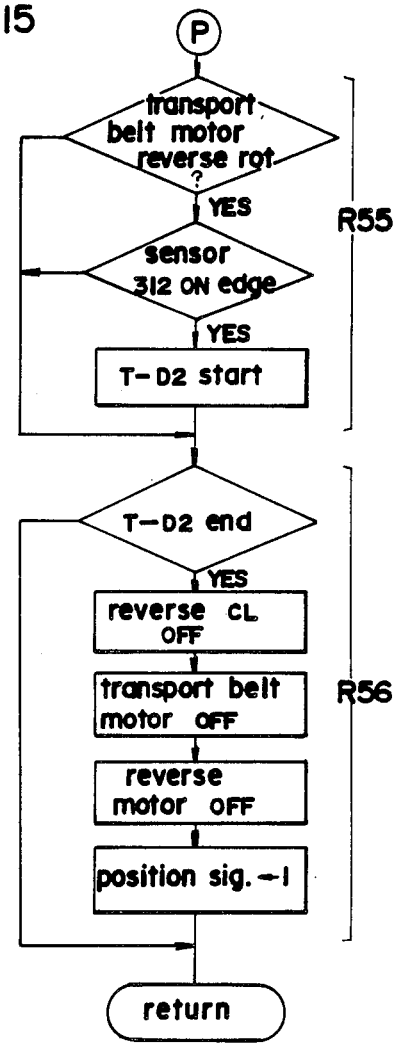

COPYING APPARATUS WITH A DOCUMENT FEEDER

BACKGROUND OF THE INVENTION

1. Field of the Invention:

The present invention relates to a copying apparatus with an automatic document feeder (hereinafter referred to as ADF), and more particularly to a copying apparatus with an interrupting function wherein the multi-copying operation of a document is interrupted to allow copying of other documents.

2. DESCRIPTION OF THE PRIOR ARTS:

A copying apparatus with the automatic document feeder is advantageous for rapid copying since said apparatus automatically as well as continuously feeds sheet documents onto an exposure position and also automatically discharges the sheet documents after completion of each copying.

However, the above-mentioned copying apparatus may be required to carry out an interruption copying operation for copying another document during the multi-copy operation based on the document fed by the ADF to the exposure position. This interruption copy is carried out by operating an interruption key provided on the copying apparatus. However, said copying apparatus, when used in an interruption mode, has a drawback of requiring manual resetting of the original document to the exposure position after completion of the interruption copy. For example, U.S. Pat. No. 4,273,439 discloses a copying apparatus with ADF which judges whether the document now under copying should be removed or not at the time of pushing an interruption/start key. When judged to remove the document, the document is discharged from the exposure position for a new document to be placed at the exposure position for interruption copy. However, this type of copying apparatus also has a drawback of requiring the document discharged from the exposure position to be placed back manually on the exposure position for restarting copying of the remaining number of copies after the completion of the interrupt copy- ing.

Further, a copying apparatus with ADF has been proposed which is capable of automatically reversing faces of a document carrying images on the both faces. This apparatus at first carries out the copying operation for an image on one side of the duplex document. Subsequently, the document is fed automatically to reverse the document for copying the other side thereof. However, the ADF having the above-described reverse function discharges the document when the interruption order is input for copying another document. Therefore, this type of ADF also has a drawback of requiring manuel resetting of the document after the interruption copying.

Consequently, the conventional copying apparatuses with ADF are quite inconvenient to carry out the interruption copying as the documents must be discharged and placed back manually on the exposure position.

SUMMARY OF THE INVENTION

It is accordingly a primary object of the present invention to provide a copying apparatus with a document feeder which is free of said drawbacks and capable of effecting an interruption copying mode conveniently.

Another object of the present invention is to provide a copying apparatus with a document feeder which is capable of automatically feeding an original document back onto an exposure position upon completion of an interruption copying mode.

Another object of the present invention is to provide a copying apparatus with an automatic document feeder wherein an original document being copied is moved out of an exposure position temporarily to allow other documents to be copied and automatically feeding the original document back onto the exposure position.

Still another object of the present invention is to provide a copying apparatus with a document feeder wherein an interrupting copying mode can be effected simply and conveniently.

These and other objects of the present invention are accomplished by providing a copying apparatus which comprises a document feeding means for feeding a document placed on a support table; a document retaining means provided downstream of said document feeding means for receiving and retaining the document temporarily thereat; an interruption copying mode for interrupting the document being copied to enable copying of another document; first control means to activate said document feeding means to feed the document to said document retaining means for effecting said interruption copying mode, said document retaining means retaining the document while said interruption mode is being effected; and second control means for activating said document retaining means to feed the document back onto the support table upon release of said interruption copying mode.

BRIEF DESCRIPTION OF THE DRAWINGS

FIGS. 11a and 11b are flowcharts showing steps of a copying operation according to the present copying apparatus;

FIG. 15 is a flowchart showing a process of a document feed reverse routine;

DETAILED DESCRIPTION OF THE INVENTION

Figure 1:
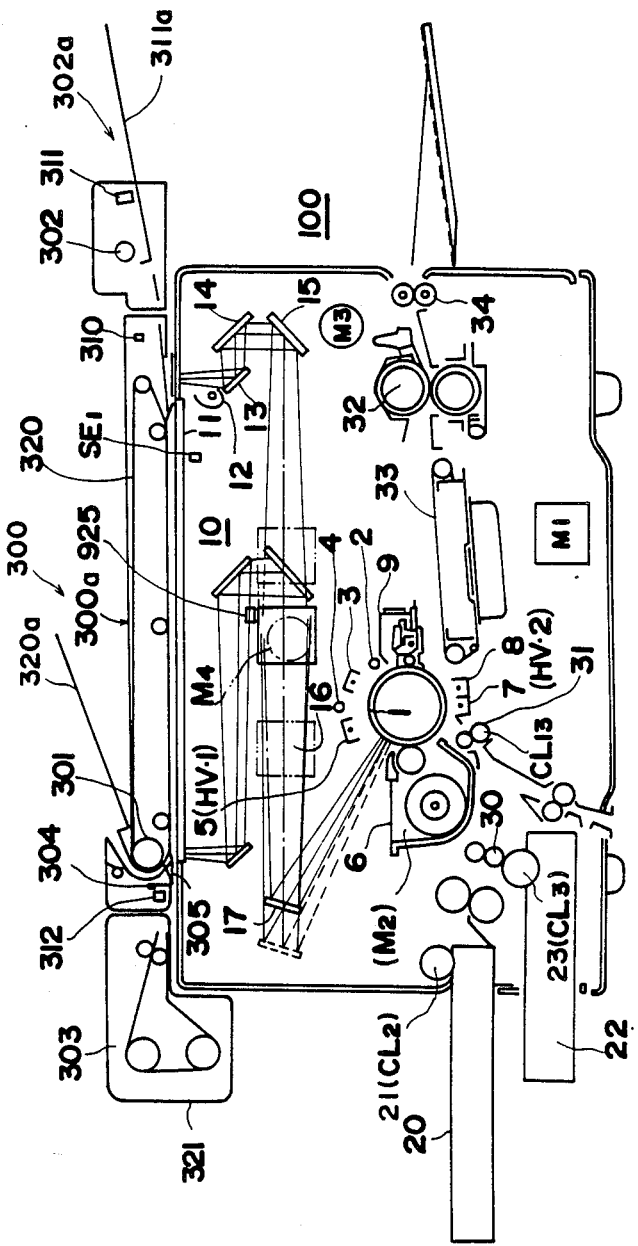
FIG. 1 is a sectional view of a copying apparatus with an automatic document feeder according to the present invention.

FIG. 1 schematically shows a copying apparatus of the present invention.

The copying machine, generally designated at 100, has a photosensitive drum 1 disposed substantially centrally in the copying machine and rotatable counterclockwise. The copying machine 100 also includes an eraser lamp 2, an interimage unit comprising a charger 3 and a lamp 4, a corona charger 5, a developing unit 6, a transfer charger 7, a separation charger 8, and a cleaning unit 9, all disposed successively around the photosensitive drum 1. The photosensitive drum 1 has a photoconductive surface layer which is uniformly charged as it moves past the eraser lamp 2 and the corona charger 5, and subsequently the photosensitive drum 1 is exposed to an optical image of a document by a scanning optical system 10.

The optical system 10 disposed below a document support table 11 to scan the image of the document includes a light source 12, movable mirrors 13, 14, 15, a lens 16, and a mirror 17. The light source 12 and the movable mirror 13 are movable integrally to the left at a speed of v/m (v: peripheral speed of the photosensitive drum 1, which is constant at all times regardless of how copied images are magnified in size, m: magnification of copied images). The movable mirrors 14, 15 are movable integrally leftward at a speed of v/2m.

The automatic paper feeding sections 20 and 22 each having a sheet feed roller 21, 23 are provided at the left side of the copying apparatus 100, as viewed in FIG. 1. Along a sheet transporting path, said sheet feed rollers 21 and 23 each connected to clutches CL$_2$, CL$_3$, intermediate rollers 30, timing rollers 31, a transporting belt 33, heat rollers 32, and discharge rollers 34 are disposed to feed and discharge the sheet.

The copying apparatus as shown in FIG. 1 generally operates as follows.

Upon commencement of the operation of the copying apparatus, the sheet feeding roller 21 or 23 and the intermediate rollers 30 are rotated for transporting the sheet to the timing rollers 31, where the leading edge of the sheet is nipped and once stopped. At this moment, a paper detecting sensor 51 (FIG. 3) is actuated by the paper to become turned on.

An image forming process is started when the sheet is transported to the timing rollers 31. The photosensitive drum 1 is first charged by the charger 5 and scanning of the document with the optical system 10 is effected by moving the lamp 12, mirrors 13, 14, 15 across the support table 11 to form an electrostatic latent image on said drum 1. Thereafter, the electrostatic latent image on the photosensitive drum 1 is developed with the developing unit 6, and the visualized image is transferred onto the sheet and fixed.

During the image forming process, a timing switch SE1 is actuated by the first mirror 13 to generate a timing signal of "1" and this begins feeding of the sheet from the rollers 31 for the leading edge of the image on the photosensitive drum 1 to coincide with the leading edge of the sheet at the position of the transfer charger 7. The sheet with the image transferred is further transported for fixing by the heat rollers 32 and discharged out onto a tray by the discharge rollers 34 at which time the trailing edge of the sheet passes through a discharge switch. The copying operation terminates after a predetermined time.

The automatic document feeder 300 (ADF) generally comprises a document table unit 302a for supplying stacked documents one by one, a document feed unit 300a for feeding the supplied document to the prescribed exposure position and for discharging the document therefrom, and a document reversing unit 321 for reversing the document fed from the document feed unit 300a and feeding back for copying the other side of the document.

The document table unit 302a includes a document supporting table 311a, a sensor or a switch 311 for detecting the presence of sheet documents on the table 311a, and a motor 302 for driving rollers (not shown) to feed the document one by one. The document feed unit 300a disposed on the document support table 11 includes a document transporting belt 320 rotatably supported by a plurality of rollers including a drive roller 301 connected to a motor, and a sensor 310 for detecting the passage of the document from the table unit 302a. The transporting belt 320 transports the document onto the prescribed exposure position at which time the belt is stopped and after making a desired number of copies, the belt 320 is driven to discharge the document either to a discharge tray 320a or to the document reversing unit 321. A pivotable lever 305 actuatable by a solenoid 304 guides the document to the tray 320a or to the unit 321. When the document is fed to the reversing unit 321, the passage thereof is detected by a sensor 312 and the document is further transported by a plurality of rollers on to which a belt is suspended. The rollers are driven by a motor 303 and the document is reversed by going through a U-turn path for transportation back to the support table 11. In this way, images on both sides of the document are copied. It should be noted that the reversing unit 321 temporarily holds the document therein when an interruption copying mode is commenced.

A document density sensor 925 provided in a light path of the optical scanning system detects the density of the document to be copied and automatically adjusts the copying density as will be further explained hereinbelow.

Figure 2:
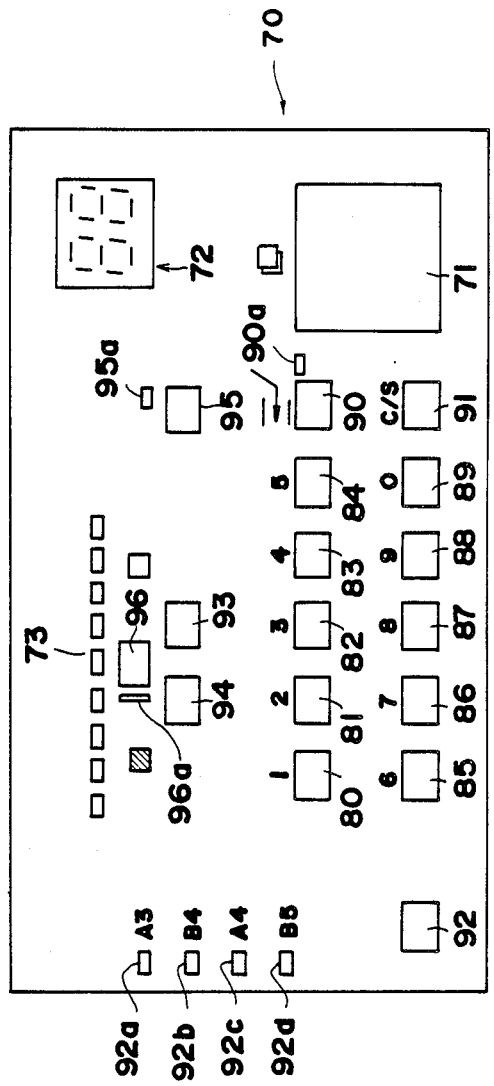
FIG. 2 is a plan view of a control panel of the copying apparatus.

FIG. 2 illustrates control keys arranged on a control panel of the copying apparatus. The control panel 70 has the print key 71 for starting copying operation, a numerical indicator 72 for setting copying number up to two figures, a ten-key cluster composed of keys 80 through 89 corresponding to numbers "1", "2", ... "9", "0", respectively, an interrupt key 90 for commanding an interrupt copying, a clear/stop key 91 for stopping the copying operation and to clear the numerical memory of the indicator 72, up and down keys 93, 94 for changing or selecting densities of copied images stepwise, density indicators 73, and an electrical counter check switch 95 for checking the number of copies mode.

The control panel 70 further includes a sheet selection key 92 for selecting the upper or lower sheet cassette 20, 22 by size, paper size indicators 92a to 92d, a duplex copying key 95 for commanding a duplex copying, a duplex copying indicator 95a, an automatic exposing key 96, and an automatic exposing indicator 96a. An indicator 90a is lit when the interruption key 90 is pressed.

Figure 3:
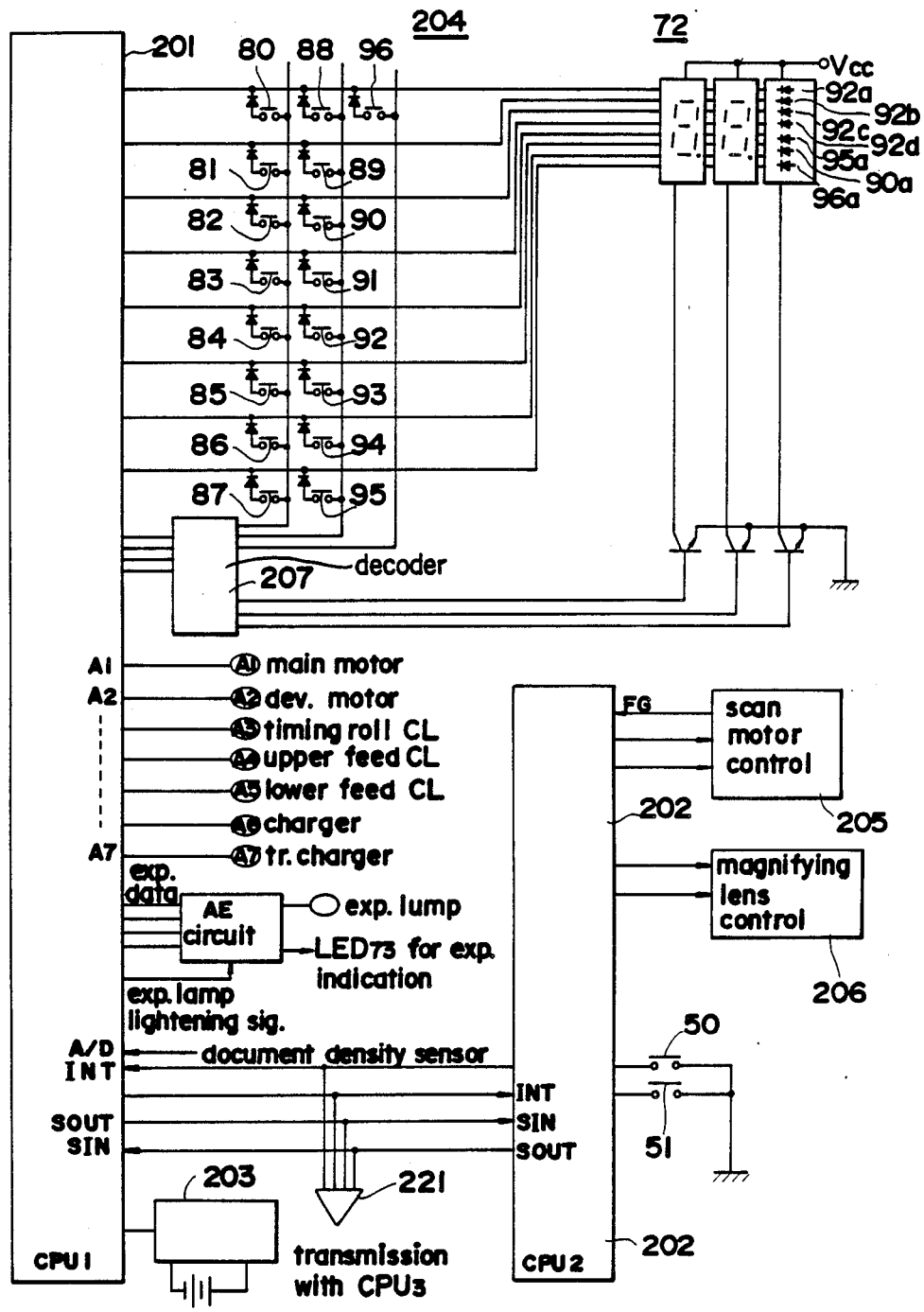
FIG. 3 is a diagram of a master central processing unit (CPU) for controlling the copying apparatus.

FIG. 3 illustrates a control circuit for the copying apparatus of the present invention, wherein the second CPU 202 controls the optical the optical system 10 and the first CPU 201 controls said second CPU 202 connected through an interrupt terminal INT and data input terminals Sin and Sout. The control circuit further includes RAM 203 backed up by a battery, a switch matrix 204, a driving circuit 205 for driving a direct current motor M3 for the document scanning by the optical system 10, a driving circuit 206 for driving a stepping motor M4 for changing magnification, and a decoder 207. The output terminals A1 to A7 are connected to the transistors (not shown) for driving a main motor M1, a developing motor M3, a timing roller clutch CL1, an upper feed clutch CL2, a lower feed clutch CL3, the corona charger 5, and the transfer charger 7 respectively.

In the RAM 203, not only various data for controlling the copying operation are programmed through those keys in FIG. 2 but also data are shifted from the ROM in the CPU.

Figure 4:
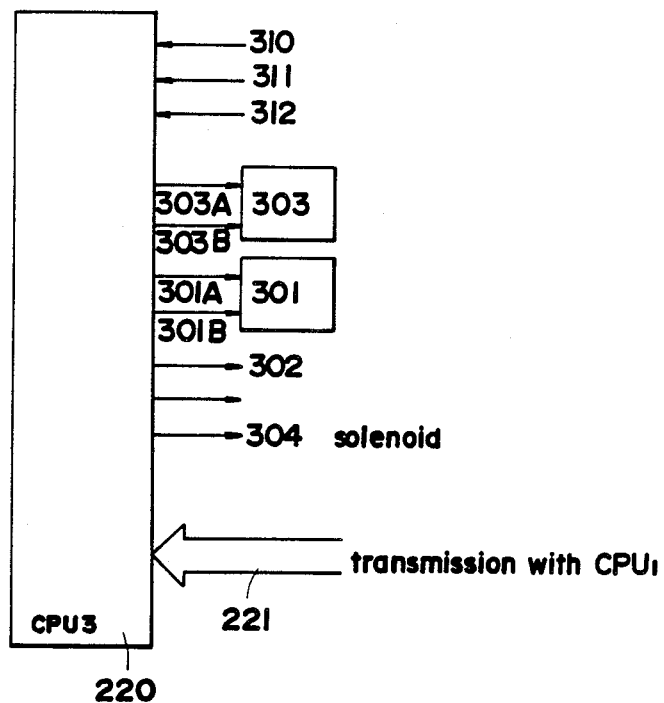
FIG. 4 is a diagram of a central processing unit (CPU) for controlling an automatic document feeder.

The third CPU 220 shown in FIG. 4 for controlling the ADF 300 communicates with CPU 201 through a bus 221. This CPU 220 is connected to the sensors 310, 311, 312 to detect the jamming of the document and to also to the motors 301, 302, 303. The motors 301, 303 are connected through lines 301A, 301B and 303A, 303B respectively to control the rotational directions of the transporting belt 320 in the feed unit 300a and the belt in the reversing unit 321. The solenoid 304 is also controlled to pivot the lever 305.

The copying operation by the CPUs 201, 202 and 220 will now be explained according to the flowcharts.

Figure 5:
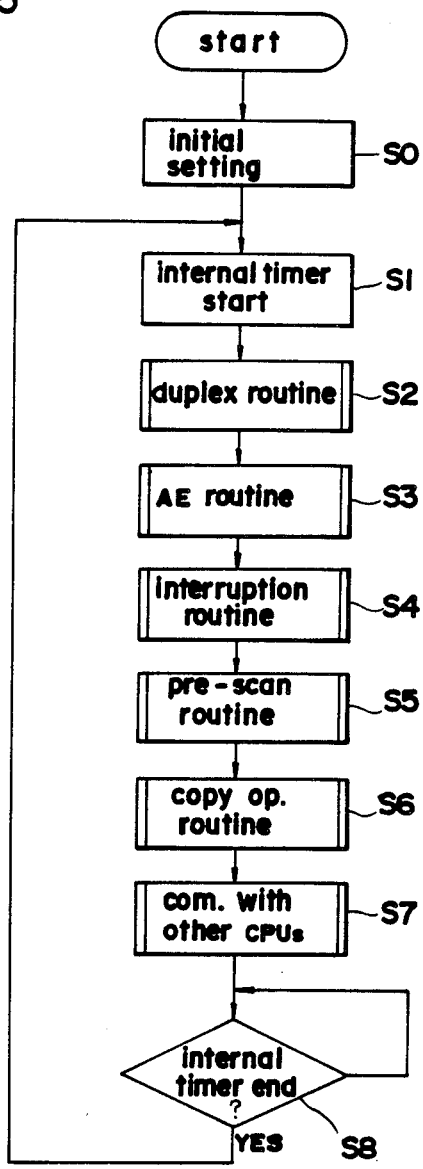
FIG. 5 is a flowchart showing the control process to be executed by a master CPU.

FIG. 5 shows a flowchart of successive steps of control operation of the CPU 201.

When the CPU 201 is reset to start the program, the CPU is initialized, i.e., the content of the RAM is erased and various registers are set, and the initialization is performed to set the apparatus to an initial mode (step S0). Subsequently, an internal timer included within the CPU 201 and set to the initial value at the initialization is initiated at step S1. Thereafter, the subroutine steps S2 to S7 explained hereinbelow according to the flowcharts are successively called, and after the completion of all the sub-routine processes, a routine ends upon termination of the internal timer at step S8 to return to set the initial internal timer again. The length of one routine is used for counting various timers appearing in the subroutines. (The various timers determine the completion of the timers by counting the number of this one routine.)

Moreover, the CPU 201 communicates data items with other CPUs 202 and 220 upon calling of all subroutines.

Figure 6:
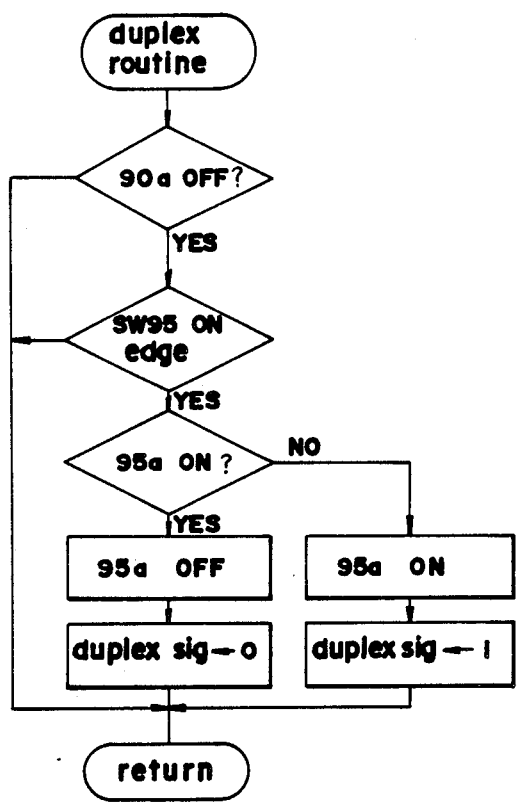
FIG. 6 is a flowchart showing a process of a duplex document routine.

FIG. 6 is a routine for the duplex mode of S2 in FIG. 5 and at first judges whether the interruption indicator 90a is ON or OFF. If the duplex copying indicator 95a is ON (The duplex copying is under selection) in response to the ON edge of the duplex copying switch 95, the duplex copying indicator 95a is made OFF to set the duplex copying signal to "0". If the duplex copying indicator 95a is OFF, said indicator is made ON to set the duplex copying signal to "1".

Figure 7:
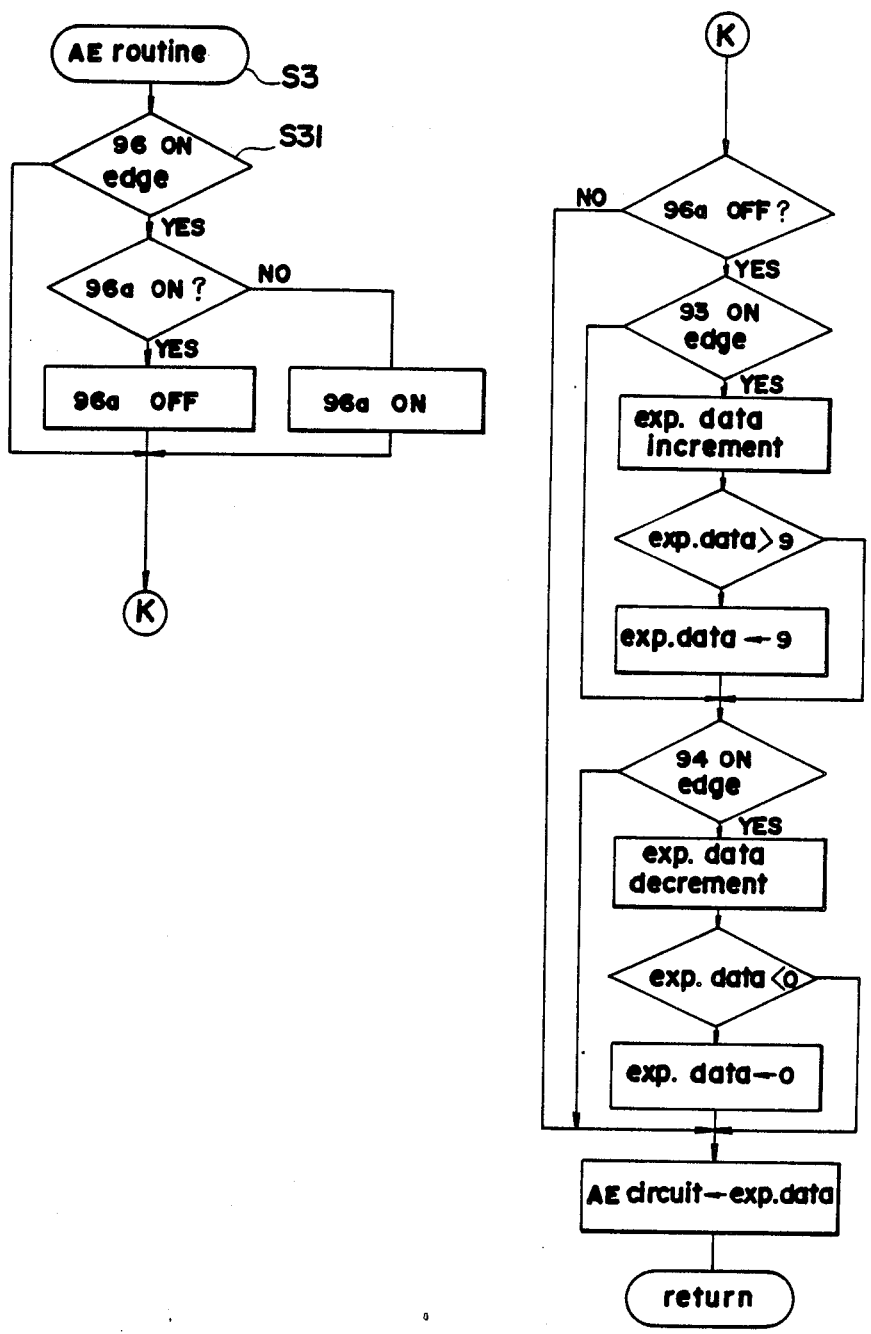
FIG. 7 is a flowchart showing a process of an automatic exposure routine.

FIG. 7 illustrates an automatic exposure routine.

When the automatic exposing switch 96 is detected to show the ON edge at step S31, the automatic exposing indicator 96a is made ON or OFF. When the indicator 96a is OFF which means manual exposing, the exposing data are incremented in response to the ON edge of the exposing up switch 93, and the exposing value above nine is corrected to nine. Similarly, the decreased value below 0 in respeonse to the ON edge of the exposing down switch 94 is corrected to 0. Thus obtained exposing data are delivered to the automatic exposure circuit which indicates the data on the exposing indicator LED array 73, and simultaneously lights the exposing lamp 12 by supplying the proper lamp voltage upon receiving the exposing lamp lighting signal.

Figure 8:
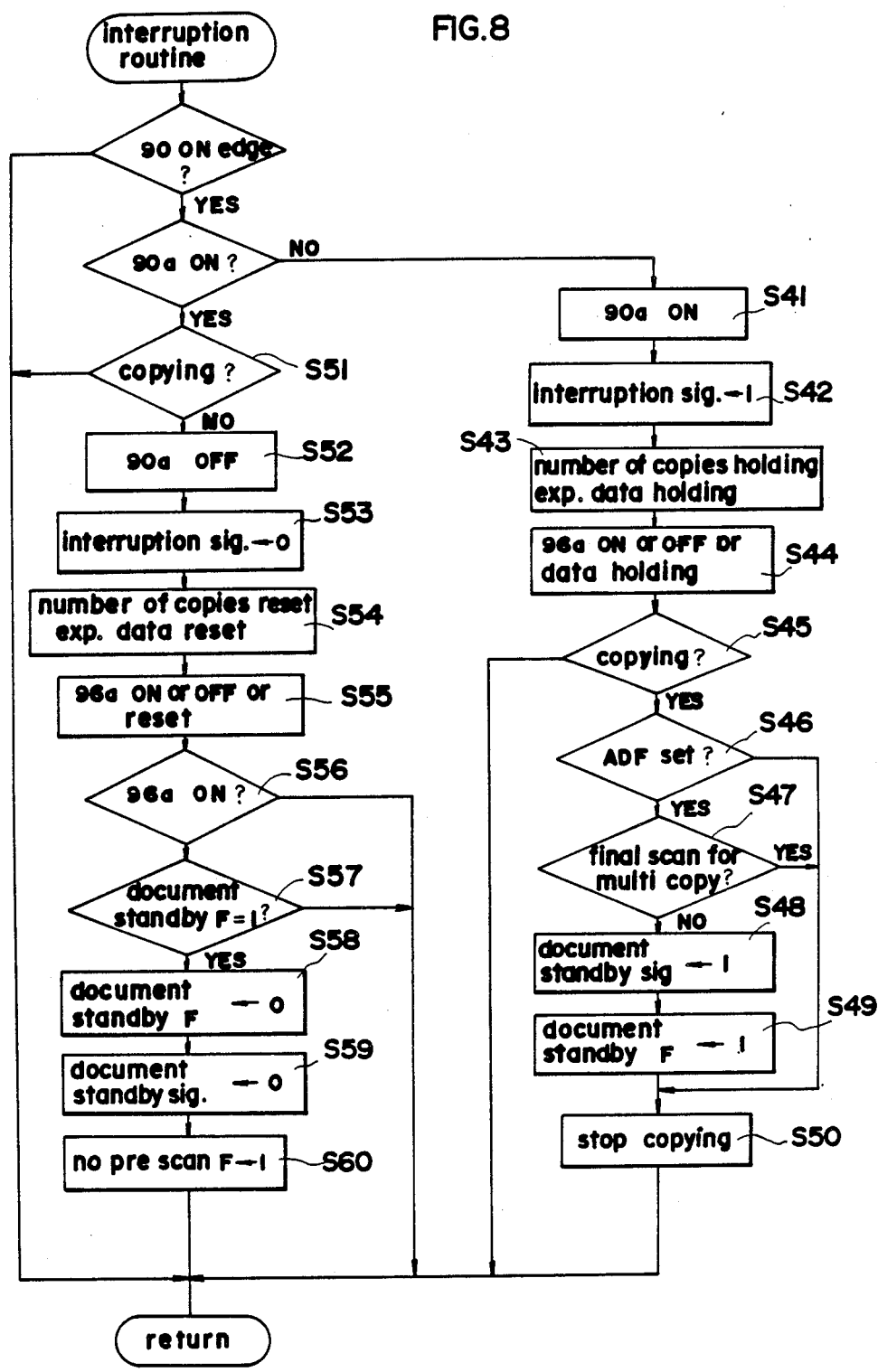
FIG. 8 is a flowchart showing a process of an interruption switch routine.

FIG. 8 illustrates a routine of an interruption switch process.

When the interruption indicator 90a is OFF at the ON edge of the interruption key 90, the sequence proceeds to the process for the interruption mode. The interruption indicator 90a becomes ON at step S41 and the interruption signal is set to "1" at step S42. At step S43, the RAM stores the number of copies indicated on the 7 segment LED 72 and the exposing data indicated on the LED array 73. The RAM also stores whether the automatic exposing indicator 96a is ON or OFF (whether the automatic exposing mode is selected or not) at step S44. Steps 45 and 46 judge whether the copying operation is now under way with the ADF 300. And further, step S47 determines whether the final scan for the multi-copy is now under way or not. When the final scan, i.e., the last copy for the multi-copy has not been executed at step S47, which means the mode for transporting the document to the document reverse unit 321 for temporarily holding therein, a document stand-by signal and a document stand-by flag are set to "1" at steps S48 and S49 respectively to thereby stop the copying operation. That is, in case the interruption key 90 is depressed during the final scan of the multi-copy, the copying is discharged as the document thereof has been completed. However, the document will be transported to the reversing unit 321 for temporarily holding therein if the final scan is not under way.

When the interruption key 90 is depressed with the interruption indicator 90a being already lit, step S51 judges whether the copying operation is now being carried out. The interruption mode cannot be released during the copying operation. If the copying operation is not being carried out, the interruption indicator 90a is made OFF at step S52 to set the interruption signal to "0" at step S53. Then, steps S54, S55 determine whether the exposing indicator 96a and the number indicator 72 of copies are ON or OFF which were stored at the beginning of the interruption. If the step S56 judges the automatic exposing indicator 96a to be ON (which means the automatic exposing mode) and the document standby flag to be "1" at step S57 (which means the document is held in the document reverse unit 321), the document standby flag and the document standby signal are set to "0" at steps S58 and S59, and non-prescan flag is set to "1" at a step S60. As described above, the document is held at the document reverse unit 321 when the interruption copying is required during the copying process with the automatic exposing mode. When the interruption copying is released, the document in the reversing unit 321 is returned to the exposing position on the table 11. At this time, there is no need to detect the density of the document by prescanning again as the preceding exposing data has been stored in the RAM at step S43.

Figure 9:
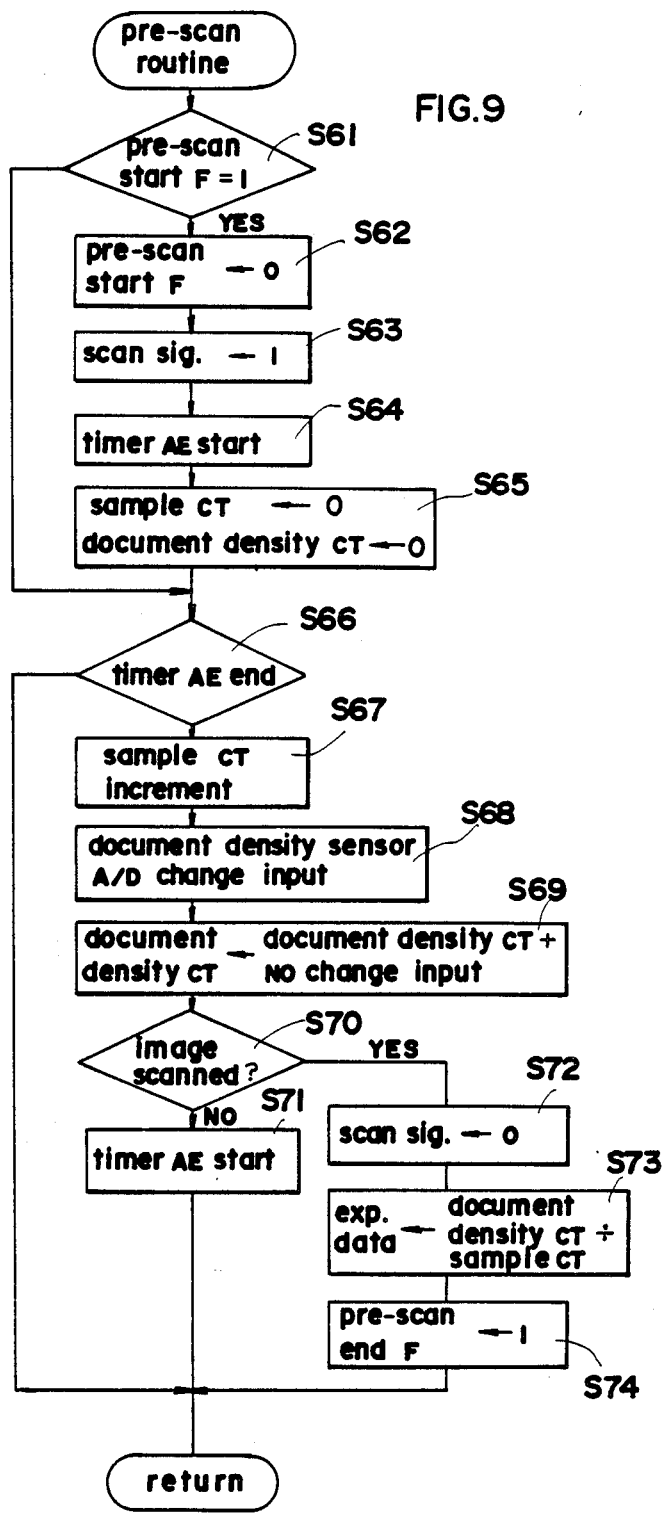
FIG. 9 is a flowchart showing a process of a prescan routine.

FIG. 9 illustrates a prescan routine for the automatic exposure control.

When a prescan start flag is "1" at step S61, step S62 sets the flag to "0" to deliver a scan signal to the CPU 202. Subsequently, a timer AE is started at step S64, and a sample counter and a document density counter are set to "0" at step S65. This timer AE is the one for sampling interval. In case of measuring the document at every 10 mm as the optical system 10 is scanned across, the timer may be set to the value of 10 mm/(scan speed). After the completion of this timer AE, step S67 increments the value of the sample counter for counting the number of the samplings, and further adds the A/D conversion value of the output from the document density sensor 925 to the document density counter.

When the document is scanned for determining the density, the scan signal is set to "0" at step S72 to move the optical system 10 back to the initial positions. The exposing data has the value represented by (the value of the document density counter)/(the value of the sample counter), which means the average density. A prescan end flag is set to "1" at step S74. If the exposing data of the document have not yet fun obtained, the timer AE is again started.

Figure 10A:
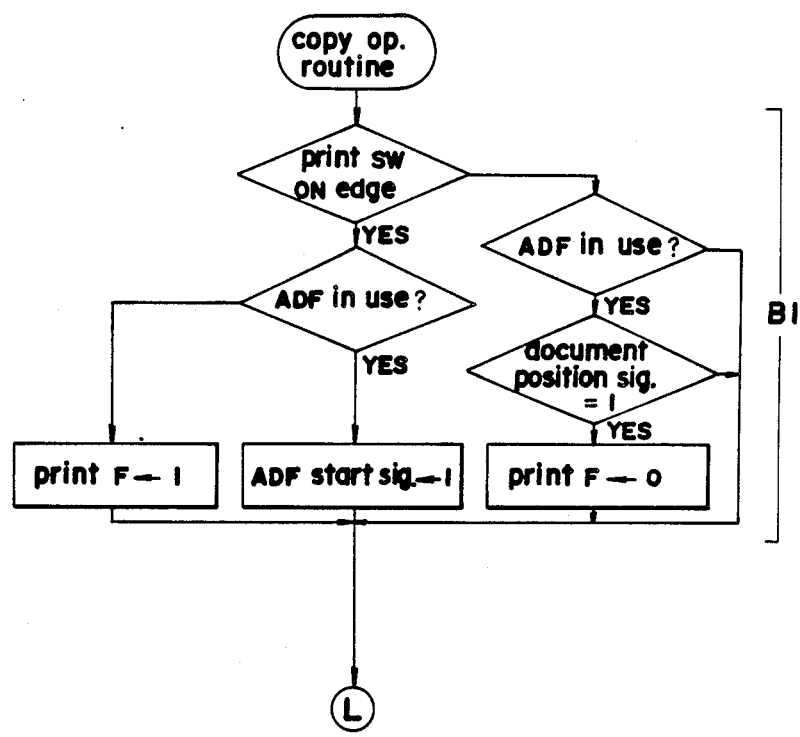
FIGS. 10a and 10b are flowcharts showing a process of a copying operation routine.
Figure 10B:
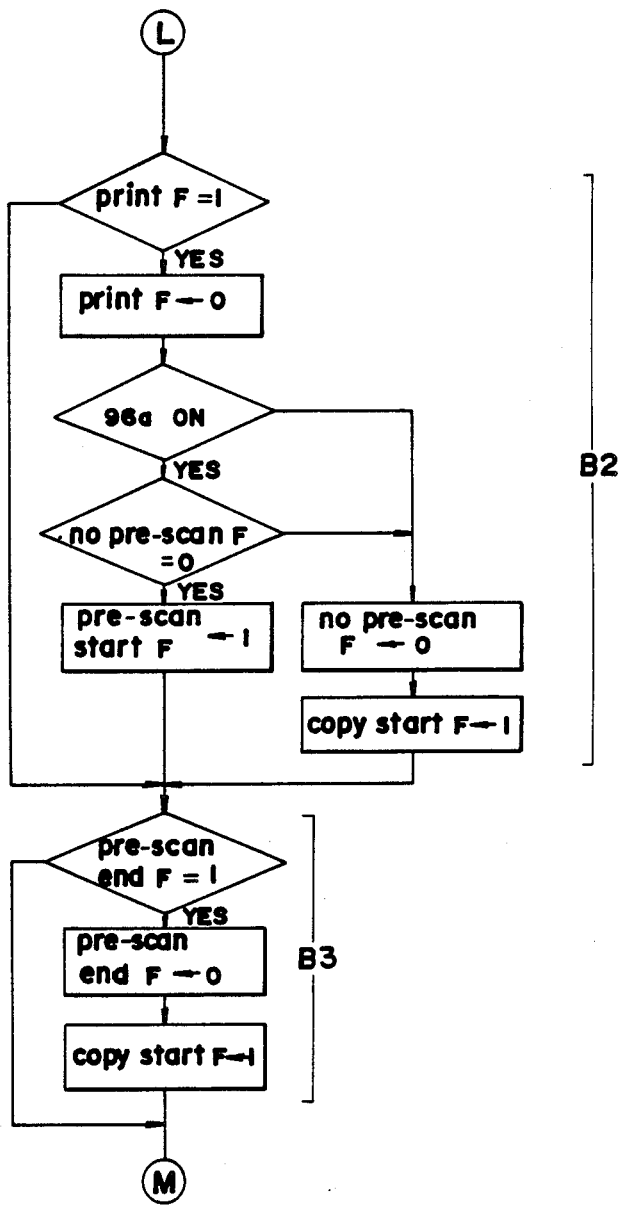

With reference to FIGS. 10a and 10b, a print flag is set to "1" if the ADF is not in use at the ON edge of the print key 71. If the ADF is in use, an ADF start signal is set to "1" to the ADF. When the print key 71 is not presenting an ON edge and the ADF is in use, the print flag is set to "0" by a document position signal of "1" from the ADF (at block B1). The print flag is set to "0" if at "1". If the automatic exposing indicator 96a is ON, that is, the apparatus is in the automatic exposing mode, and the non-prescan flag is "0", the prescan start flag is set to "1". In other cases, the non-prescan flag is set to "0" and the copy start flag to "1" (at block B2). If the prescan in the automatic exposing mode is effected, the prescan end flag is set to "0" from "1", and the copy start flag is set to "1" enable to copying (at block B3).

Figure 11A:
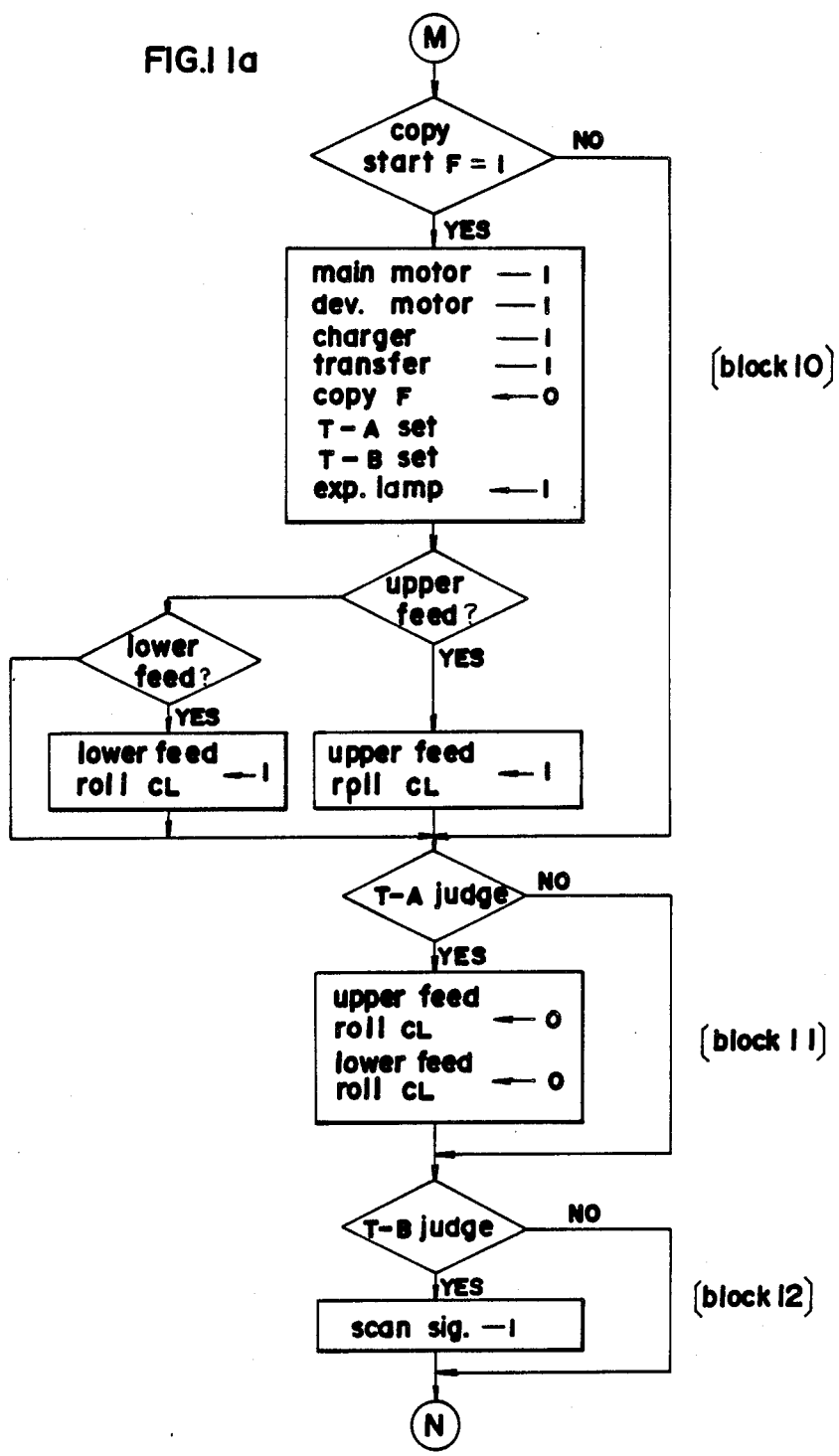
Figure 1:
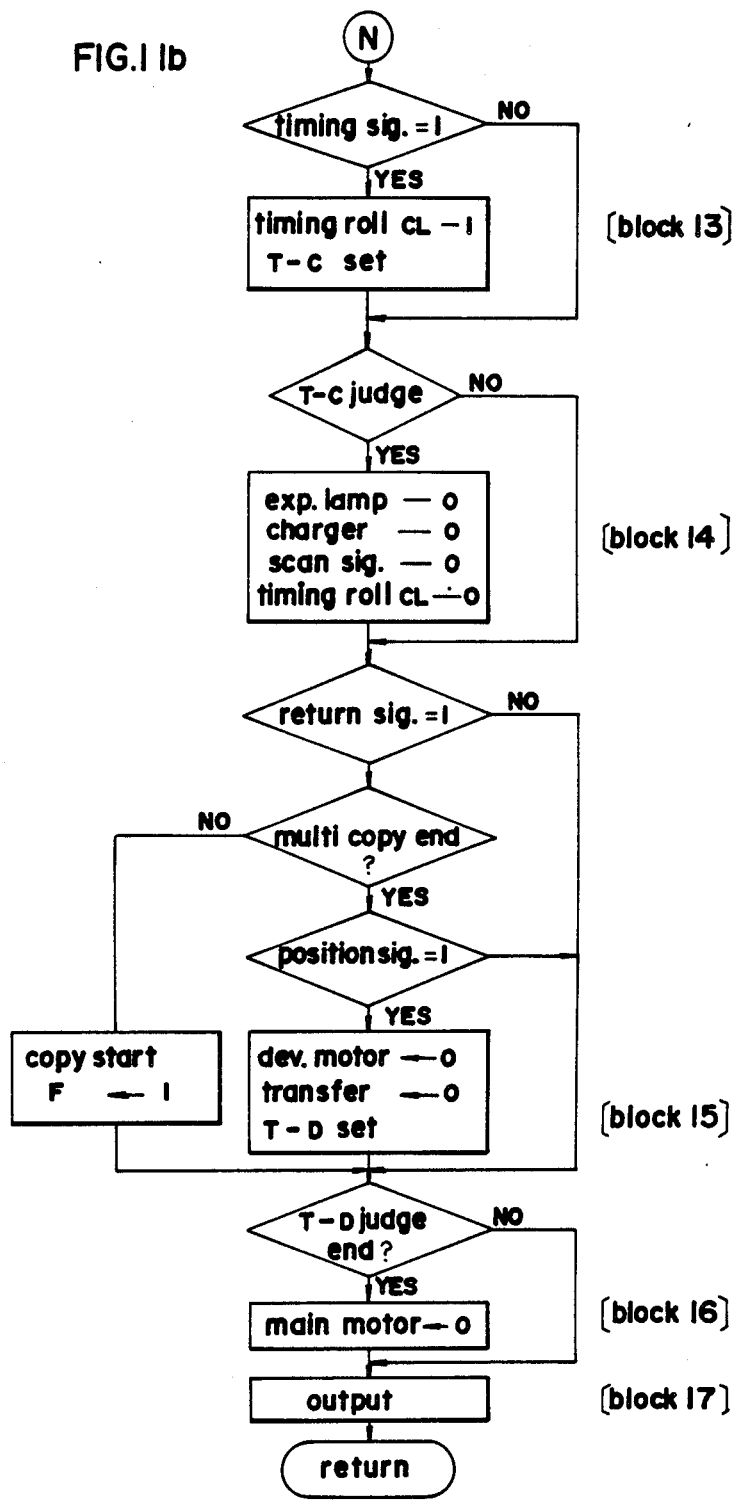
Figure 12:
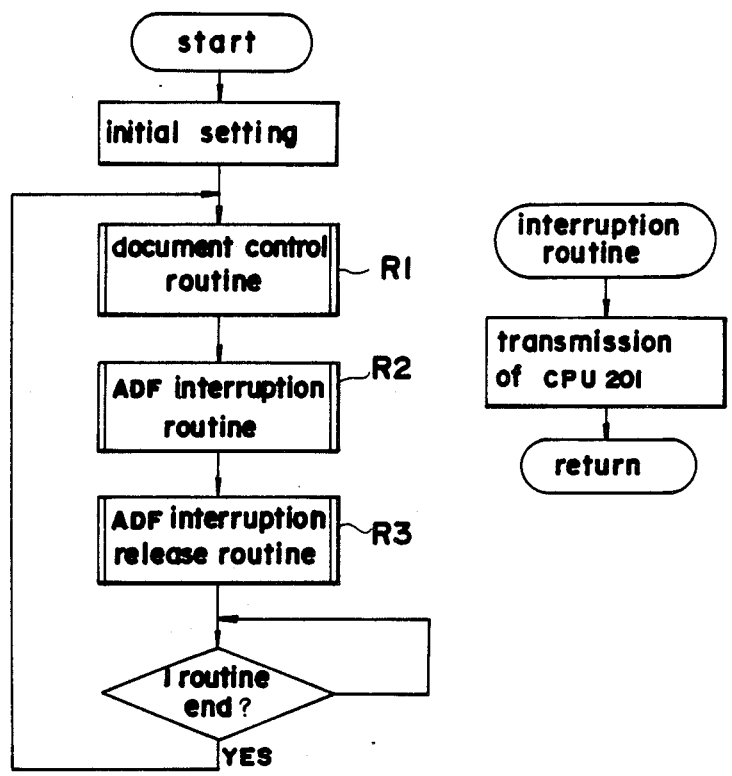
FIG. 12 shows a flowchart showing the control process to be executed by the CPU for controlling the ADF.

FIGS. 11a and 11b are flowcharts showing the copying operation of the copying apparatus. With reference to FIGS. 11a and 11b, the setting "1" on the copy start flag energizes the main motor M1, the developing motor M2, and the corona/transfer chargers HV1, 2 and the exposure lamp 12 to be ON. If the upper feed cassette 20 is selected, the upper feed roller clutch $CL_2$ is energized, and if the lower feed cassette is selected, the lower feed roller clutch $CL_3$ is energized. Then, the copy start flag is set to "0" to thereby set timers T-A (timer A) add T-B (timer B). At block 11, the timer T-A is judged to see the termination and if so, the upper and lower feed roller clutches $CL_2$, $CL_3$ are deenergized. When the judgement of the T-B shows the elapse of the timer, the scan signal becomes "1" at block 12 to cause the optical system 10 to start scanning. When a timing signal is "1" at block 13 by the actuation of the switch SE1, the clutch $CL_{13}$ for the rollers 31 is energized to set a timer T-C. At the timing of the completion of the timer T-C, a charger 5, the timing roller clutch $CL_{13}$ and the exposure lamp 12 are deenergized and the scan signal set to "0" at a block 14. When a return signal for returning the optical system 10 is "1" which means to begin return at block 15, the judgement is made whether the copying operation has been completed for the number set on the indicator 72 (multi-copy end). If the judgement is NO, the copy start flag is set to "1".

When the optical system 10, once moved from the fixed position, returns to actuate the fixed position switch to be ON, the developing motor M2 and the transfer charger 7 are set to "0" and the timer T-D is set. Upon completion of the timer T-D, the main motor M1 is deenergized at block 16. Block 17 outputs the results of the processes so far.

FIGS. 12 through 20 illustrate the operation of the CPU 220 for the ADF 300.

When the CPU 220 is reset to start the program, the CPU is initialized, i.e., the erase of the RAM 203 and the setting of various registers are effected to set the apparatus to an initial mode.

Thereafter, an internal timer included within the CPU 220 and set to a certain time at the initialization is ini- tiated.

Subsequently, the subroutines of a document control routine R1, an ADF interruption routine R2 and an ADF interruption release routine R3 are successively called. When all the subroutines are called, a single routine is completed upon the completion of the internal timer set at the beginning. The length of the routine is used for counting the various timers appearing in the subroutines. (The various timers determine the completion of the timers by counting the number of this single routine.)

Further, the data communication with the CPU 201 is carried out by the interruption routine upon actuation of interruption key 90 regardless of the main routine.

Figure 13A:
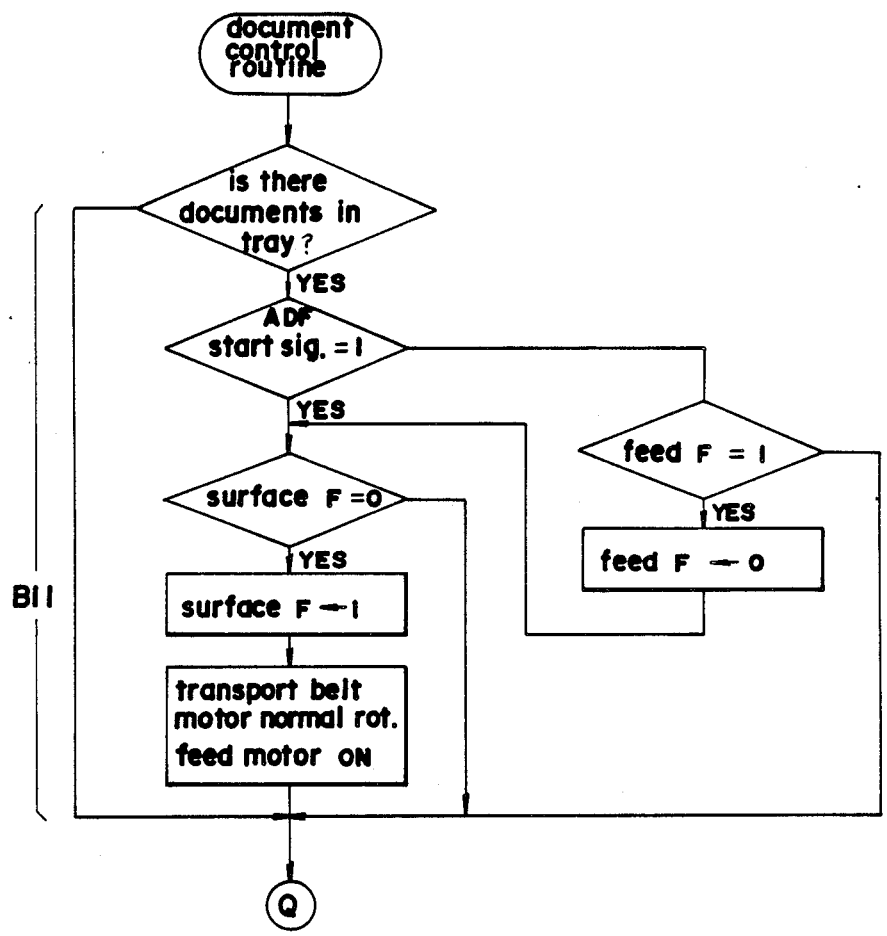
FIGS. 13a and 13b show a flowchart showing a process of a document control routine.
Figure 13B:
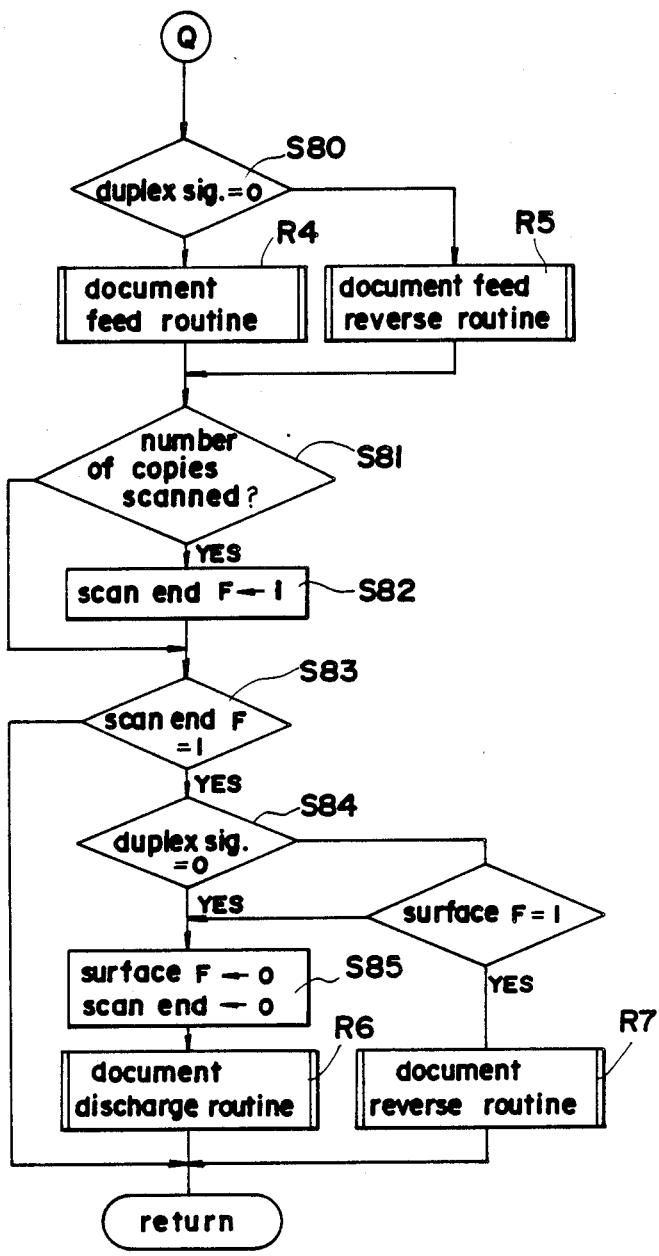

FIGS. 13a and 13b illustrate the document control routine R1.

When there is a document on the document tray 311a of the table unit 302a and the sensor 311 is ON, the ADF start signal from the CPU 201 is set to "1". When the document feed flag is "1" and the surface flag is "0" which means the mode for copying the front surface of the document, the motor for the transporting belt 320 is rotated in the clockwise direction by the document feed motor. The feed motor 302 is also energized (at block B11). Subsequently, a step S80 (FIG. 13b) judges whether the duplex document signal from the CPU 201 is set to "0" or "1". If the duplex document signal is "0" meaning only one side of the document is to be copied, the sequence proceeds to a document feed routine R4, and the document duplex signal of "1" leads the sequence to a document feed reverse routine R5 meaning both sides are to be copied. A following step S81 determines whether the document on the support table 11 has been scanned a number of times equal to the set number of times equal to the set number of copies, and if so, step S82 sets the scan end flag to "1". When the scan end flag is "1" and the duplex document signal is "0" (at steps S83 and S84), which represents only a single side of the document to be copied, step S85 sets the surface flag and the scan end flag to "0" to effect a document discharge routine R6. In the case of the duplex document, the sequence proceeds to step S86 to judge whether the surface flag is "1" or "0". When the surface flag is "0", in other words, when the duplex document is copied in the reverse side, the process goes to step S85 to carry out the same process as the document having a single side, namely to discharge the document out to the tray 320a. When the surface flag is "1", document reverse routine R7 is executed.

Figure 14:
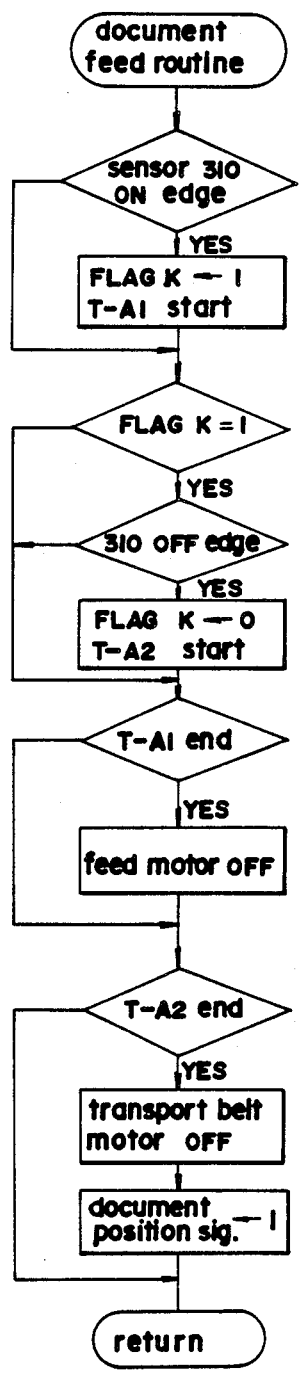
FIG. 14 is a flowchart showing a process of a document feed routine.

FIG. 14 illustrates the document feed routine R4.

When the document is fed to actuate the sensor 310 ON, a flag K is set to "1" to start the timer T-A1. This timer T-A1 is for deenergizing the document feed motor 302 and is set to the value for counting the time until the document comes to the position capable of being driven by the motor for the transporting belt 320. The timer T-A1 prevents the following document from being fed by the motor even after the feeding of the preceding document.

Thereafter, the sensor 310 generates an edge by the passage of the document when the flag K is "1". In other words, the flag K is set to "0" to start a timer T-A2 after the detection of the trailing edge of the document. The timer T-A2 is set to the value for counting the time until the trailing edge of the document arrives at the document front edge fixed position (exposing position) of the document support table 11.

The document feed motor 302 is deenergized in response to the completion of the timer T-A1. When the timer T-A2 elapses, the rotation of the transporting belt 320 is stopped to deliver the document position signal of "1" to the CPU 201.

FIG. 15 illustrates the document feed reverse routine R5.

When the sensor 310 actuated by the document presents an ON edge, a reverse clutch (solenoid 304) and the reverse motor 303 for the reversing unit 321 are energized and a timer T-D1 is started (at block R51). After the completion of the timer T-D1, the document feed motor connected to the roller 301 is turned off (at block R52). The timer T-D1 is set to the value for counting the time required for the document transported by the driven belt 320 to be transported out of the feed unit 300a. The following step judges whether the detecting sensor 312 has detected the arrival of the document to generate an ON edge during the normal rotation of the transporting belt roller 301. If the sensor 312 is ON edge, which means that the leading edge of the document has reached the reverse unit 321, the flag K is set to "1" (at block R53). The subsequent steps determine whether the detecting sensor 312 is OFF edge when the flag K is "1". That is to see if the document has passed through the sensor 312. When the sensor 312 is OFF, i.e., the document is transported into the document reverse unit 321 from its leading edge to its trailing edge, the flag K is reset to "0" to energize the motor for the transporting belt 320 to rotate the same reversably, i.e., in the counter clockwise direction (at block R54). Thereafter, the judgement is made whether the sensor 312 shows an ON edge during the reverse rotation of the motor for the transporting belt 320. When the sensor 312 is actuated, i.e., the document is fed back with the face reversed, a timer T-D2 is started (at block R55). This timer T-D2 is set to the value for counting the time until the document reaches the document leading edge position of the document support table 11. Upon elapse of the T-D2, the following steps cause the reverse clutch, the motor for transporting belt 320 and the reverse motor 303 to go OFF. Further, the document position signal delivered to the CPU 201 is set to "1" (at block R56).

Figure 16:
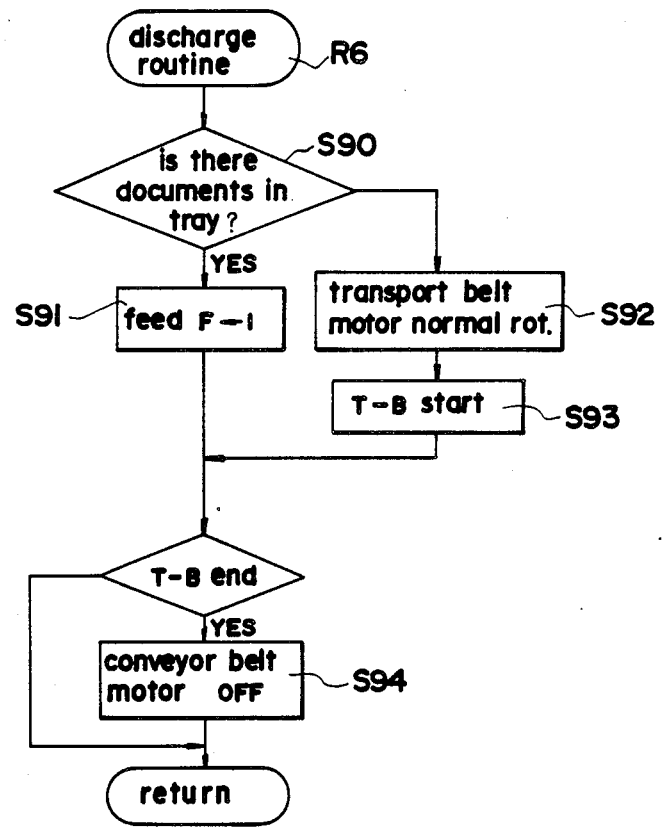
FIG. 16 is a flowchart showing a process of a document discharge routine.

FIG. 16 illustrates the document discharge routine R6.

Step S90 determines whether further documents are still present in the document tray 311a. If the next document exists in the tray 311a, the document feed flag is set to "1" at step S91. If no document is present in the tray 311a, the motor for the transporting belt 320 is driven to rotate normally at step S92 and a timer T-B is started at step S93. The timer T-B is set to the value capable of discharging the document (for the maximum sized document) on the document support table 11. Thus the document is discharged onto the tray 320a. Upon completion of the timer T-B, step S94 deenergizes the motor for the transporting belt 320.

Figure 17:
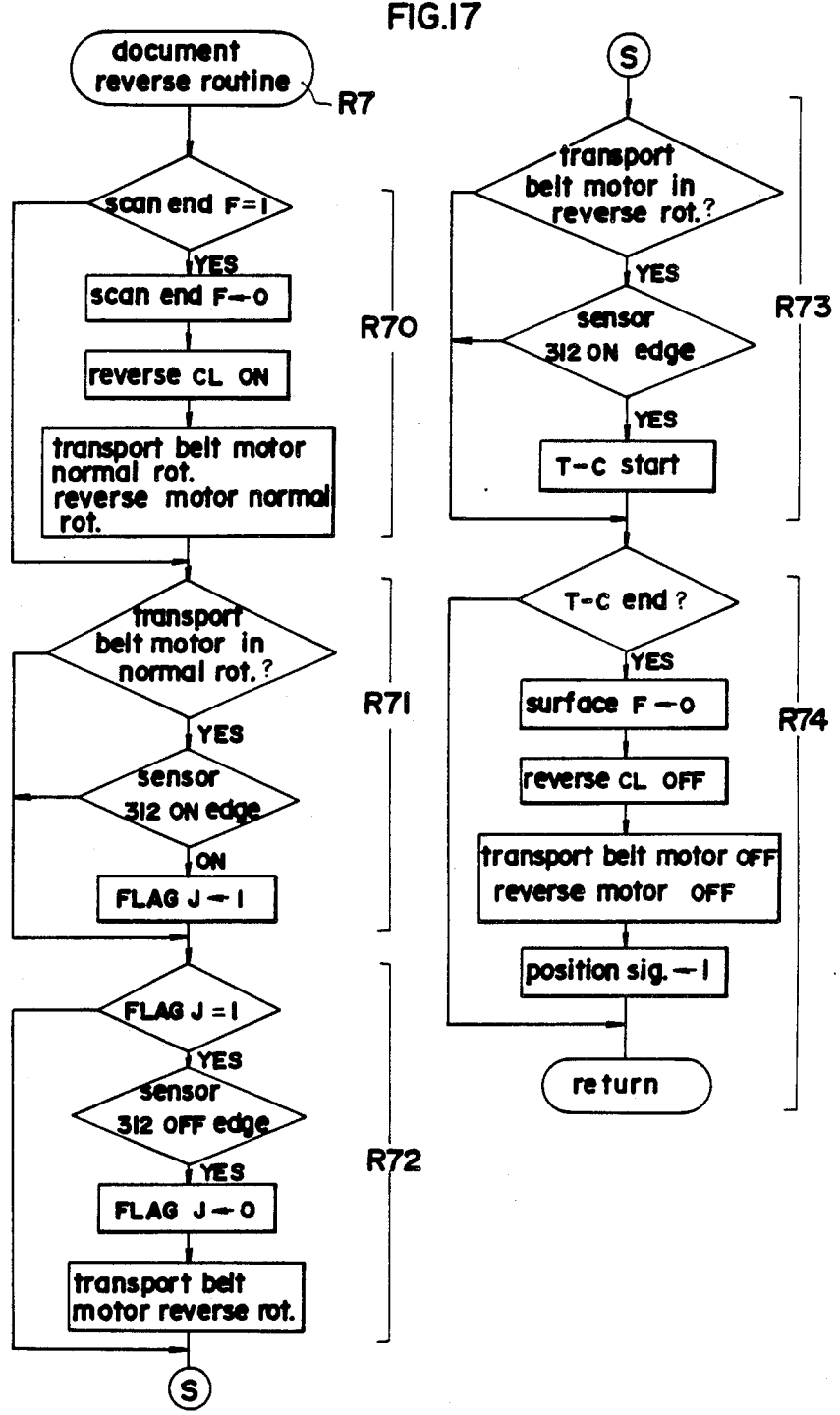
FIG. 17 is a flowchart showing a process of a document reverse routine.

FIG. 17 illustrates the document reverse routine R7.

When the scan end flag is "1" indicating the scanning by the optical system 10 has been completed, the reverse clutch becomes energized, in other words, the pivoting lever is pivoted by the solenoid 304 to allow the passage the reverse unit 321. Then, the following step makes the motor for the transporting belt 320 and the reverse motor 303 rotate normally (at block R70). At block R71, a flag J is set to "1" when the sensor 312 is detected to be turned ON during the normal rotation of the motor for the transporting belt 320, i.e., the leading edge of the document has reached the reverse unit 321. The subsequent step determines whether the sensor 312 generates the OFF edge with the flag J being "1". When the sensor 312 is detected to be OFF which means that the entire document has been transported into the reverse unit 321 from its leading edge to its trailing edge, the flag J is reset to "0" and the motor for the transporting belt 320 is driven to rotate reversely (at block R72). The document having made a U-turn is fed back and when the sensor 312 is detected to be ON during the reverse rotation of the motor for the transporting belt 320, i.e., the document is reversely discharged from the reverse unit 321, a timer T-C is started (at block R73). The timer T-C is set to the value for counting the time until the document reaches the document leading edge position of the document support table 11. Upon completion of the timer T-C, the surface flag is set to "0", and the reverse clutch, the motor for the transporting belt 320 and the reverse motor 303 are deenergized. Further, the document position signal delivered to the CPU 201 is set to "1" (at block R74).

Figure 18:
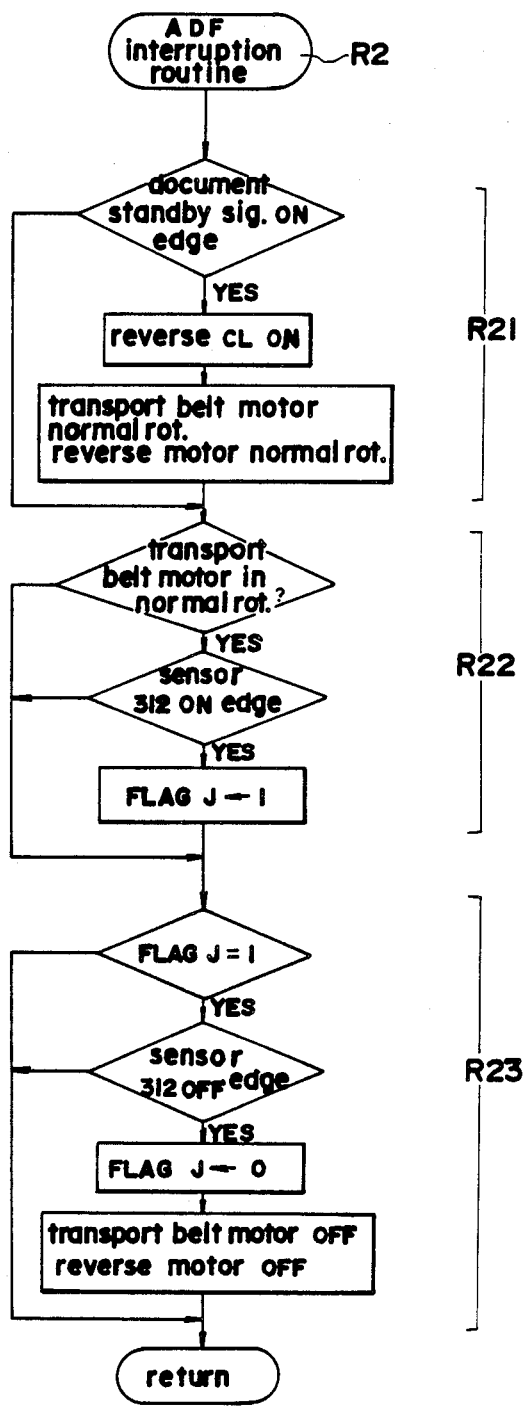
FIG. 18 is a flowchart showing a process of an ADF interruption routine.

FIG. 18 shows the ADF interruption routine R2.

With the actuation of the interruption key 90, the document standby signal generates the ON edge which is delivered from the CPU 201 and causes the reverse clutch (solenoid 304) to become energized. The motor for the transporting belt 320 and the reverse motor 303 are driven to rotate normally (at block R21). At subsequent block R22, the flag J is set to "1" in response to the ON edge of the sensor 312 during the normal rotation of the motor for the transporting belt 320 transporting the document to the reverse unit 321. With the flag J at "1", the sensor 312 becomes OFF. After the detection of the trailing edge of the document, the flag J is reset to "0" to make the transporting belt motor 301 and the reverse motor 303 OFF. The document is held in the reverse unit (at block R23) and remain therein temporarily.

Figure 19:
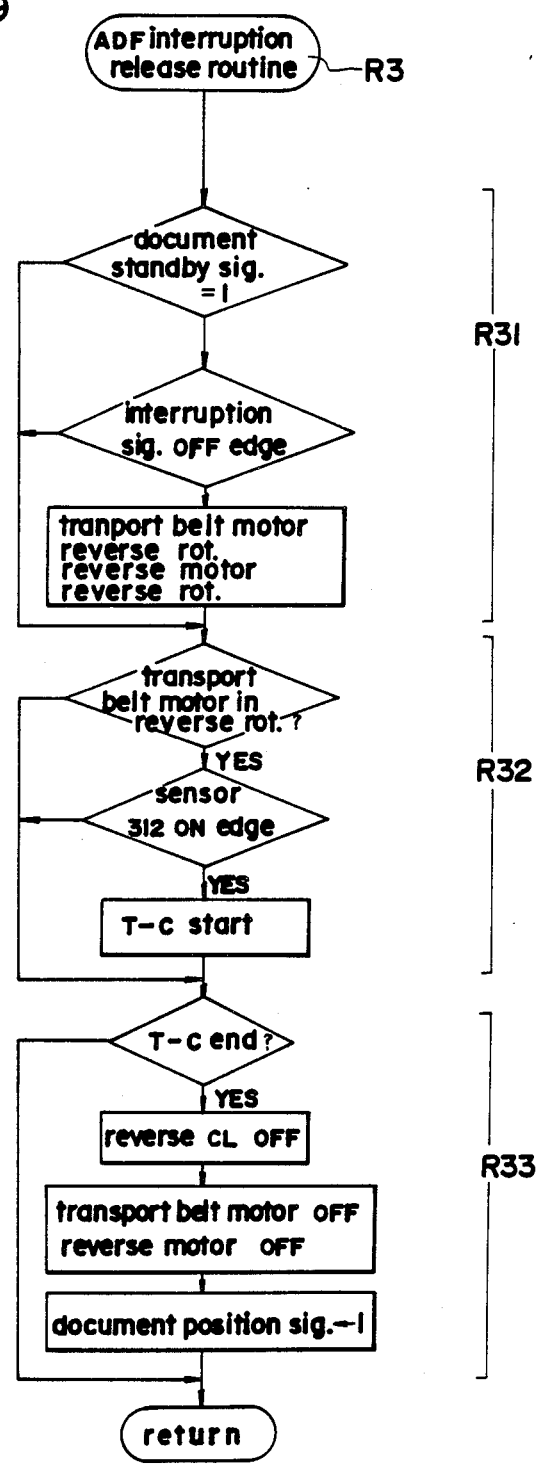
FIG. 19 is a flowchart showing a process of an ADF interruption release routine.

FIG. 19 illustrates the ADF interruption release routine R3.

When the interruption signal delivered from the interruption key 90 is an OFF edge with the document standby signal set to "1", the motor for the transporting belt 320 and the reverse motor 303 are driven to rotate reversely (at block R31). The reverse motor rotates in the opposite direction to feed back the document with the same face directed to the support table 11. Subsequently, the judgement is made whether the sensor 312 presents an ON edge during the reverse rotation of the motor for the transporting belt 320, i.e., when the document in the reverse unit 321 is about to be transported back on the document support table. If the sensor 312 is ON which means the leading edge of the document has arrived at the sensor 312, a timer T-C is set (at block R32). This timer T-C is set to the value for counting the time until the document reaches the fixed position on the document support table 11 after passing through the sensor 312. Upon elapse of the timer T-C, the reverse clutch 304, the motor for the transporting belt 320 and the reverse motor 303 become deenergized respectively. Further, the document position signal is set to "1". By this, the CPU 201 starts the copying operation (at block R33). More specifically, the original document is automatically returned onto the document support table 11 to start the copying operation for completing the remaining number of copies to be made before the interruption, only by effecting the interruption release operation.

In the above-mentioned embodiment, the reverse motor 303 is driven to rotate reversely to return the document held by the interruption. However, the process for the ADF interruption release shown in FIG. 19 may be changed as shown in FIG. 20 in case the reverse motor 303 is required to be rotated in only the normal direction.

Figure 20:
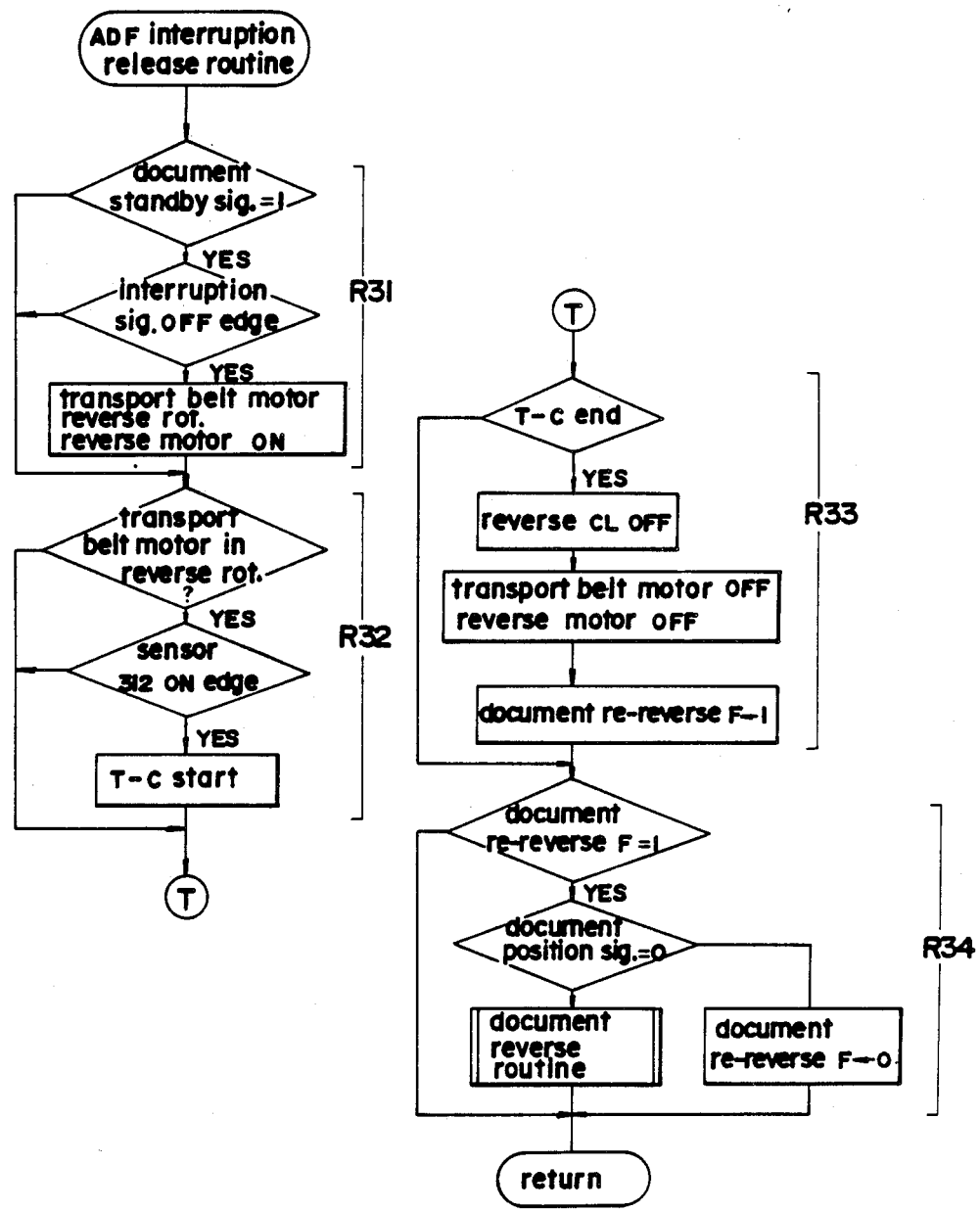
FIG. 20 is a flowchart showing a process of an ADF interruption release routine according to a second embodiment of the present invention.

In FIG. 20, the document held at the reverse unit 321 is fed back by the reverse motor 303 rotating in the normal direction as well as by the transporting belt 320 rotating reversely (R31). As the document actuates the sensor 312 with its leading edge, the timer T-C starts (R32). At the elapse of T-C, the document has reached the support table 11 at which time the document re-reverse flag is set to "1" (R33). With this flag "1", the document is fed again to the reverse unit 321 but without stopping and brought back to the support table 11 so that the same side will face the table to resume the remaining number of copies.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. In a copying apparatus which includes a photosensitive member, means for forming an electrostatic latent image of a document placed on a transparent support table, means for developing said latent image and means for transferring the developed image onto a paper, the apparatus comprising:
a document feeding means for feeding a document from the support table;
a document retaining means provided downstream of said document feeding means for receiving and retaining the document;
an interruption copying means for interrupting copying of the document on the support table to enable copying of another document;
first control means to activate said document feeding means to feed the document to said document retaining means in response to said interruption copying means, said document retaining means retaining the document while the copying of said other document is being effected; and
second control means for activating said document retaining means to feed the document back onto the support table upon completion of copying of said other document.

2. In a copying apparatus which includes a document support table for supporting thereon a document to be copied, scanning means for scanning the document to form an electrostatic image on a photosensitive member, means for developing the image and means for transferring the developed image onto a paper; the apparatus comprising:
a document feeding means for feeding the document out from the support table;
a document retaining means provided downstream of said document feeding means for temporarily retaining the document thereat;
means for setting a number of copies to be made from said document;
input means for initiating an interruption copying mode in which the copying of the document being copied is interrupted to enable copying of another document when a plural number of copies still remain to be copied;
first control means for energizing said document feeding means in response to said input means for feeding the document to the document retaining means;
means for releasing the interruption copying mode;
second control means for energizing said document retaining means to feed the document back onto the support table following the release of the interruption copying mode to resume the copying of remaining number to be copied.

3. A copying apparatus comprising:
a document support table for supporting thereof a first document to be copied;
an image forming means including a scanning means for scanning the first document to be copied;
a document feeding means disposed on said document support table for placing the first document at an exposure position on said document support table, said document feeding means including first transporting means to transport the first document in first and second directions opposite to one another;
a document retaining means provided downstream of said first direction of the transporting means for temporarily retaining the first document thereat and including second transporting means;
first control means to make plural copies of the first document in succession;
an input means for initiating an interruption copying mode for interrupting the successive copying operation of the first document and for making copies of a second document;
second control means responsive to said input means to energize said first transporting means to transport the first document in the first direction to said document retaining means for temporarily retaining the first document thereat;
means to release said interruption copying mode; and
third control means responsive to said release means for energizing said second transporting means in said document retaining means and for energizing said first transporting means in said document feeding means in the second direction so as to feed the first document back onto the exposure position to resume the copying operation of the first document.

4. A copying apparatus comprising:
a document support table for supporting thereon a first document to be copied;

an image forming means including a scanning means for scanning the first document to be copied;

means for determining an image density of the first document;

a document feeding means disposed on said document support table for placing the first document at an exposure position on said document support table, said document feeding means including first transporting means to transport the first document in first and second directions opposite to one another;

a document retaining means provided downstream of said first direction of the transporting means for temporarily retaining the first document thereat and including second transporting means;

first control means to make plural copies of the first document in succession at the image density determined by said determining means;

an input means for initiating an interruption copying mode for interrupting the successive copying operation of the first document and for making copies of a second document;

second control means responsive to said input means to energize said first transporting means to transport the first document in the first direction to said document retaining means for temporarily retaining the first document thereat;

means to release said interruption copying mode; and third control means responsive to said release means for energizing said second transporting means in said document retaining means and for energizing said first transporting means in said document freeing means in the second direction so as to feed the first document back onto the exposure position to resume the copying operation of the first document, said third control means resuming the copying operation of the first document at said image density.

* * * * *